United States Patent
Halleraker et al.

(10) Patent No.: US 11,848,121 B2
(45) Date of Patent: Dec. 19, 2023

(54) HIGH VOLTAGE ELECTRIC POWER FEED-THROUGH APPARATUS

(71) Applicant: Sentech AS, Oslo (NO)

(72) Inventors: Morten Halleraker, Oslo (NO); Helmut Mayer, Mannheim (DE); Gunter Bitz, Mannheim (DE)

(73) Assignee: Sentech AS, Oslo (NO)

( * ) Notice: Subject to any disclaimer, the term of this patent is extended or adjusted under 35 U.S.C. 154(b) by 0 days.

(21) Appl. No.: 15/981,822

(22) Filed: May 16, 2018

(65) Prior Publication Data

US 2019/0122790 A1   Apr. 25, 2019

Related U.S. Application Data

(63) Continuation of application No. 14/783,662, filed as application No. PCT/NO2014/050054 on Apr. 10, 2014, now abandoned.

(30) Foreign Application Priority Data

Apr. 10, 2013   (NO) .................................. 20130481

(51) Int. Cl.
*H01B 17/30* (2006.01)
*H02G 3/22* (2006.01)
*H01B 17/42* (2006.01)

(52) U.S. Cl.
CPC ............... *H01B 17/30* (2013.01); *H02G 3/22* (2013.01); *H01B 17/42* (2013.01)

(58) Field of Classification Search
CPC ..... E21B 33/0385; H01B 17/30; H01B 17/42; H02G 3/22
See application file for complete search history.

(56) References Cited

U.S. PATENT DOCUMENTS

| 3,680,208 A | * | 8/1972 | Bohne | ................... | H01B 17/30 |
| | | | | | 29/825 |
| 3,710,001 A | * | 1/1973 | Besson | ................... | H01B 17/30 |
| | | | | | 174/15.3 |

(Continued)

FOREIGN PATENT DOCUMENTS

| EP | 2487327 A1 | 8/2012 |
| GB | 1206564 A | 9/1970 |
| NO | 20111094 | 2/2013 |

OTHER PUBLICATIONS

Search Report received in connection with International Patent Application No. PCT/NO2014/8050054 dated Apr. 10, 2014.

(Continued)

*Primary Examiner* — William H. Mayo, III
*Assistant Examiner* — Rhadames Alonzo Miller
(74) *Attorney, Agent, or Firm* — Knobbe, Martens, Olson & Bear, LLP

(57) ABSTRACT

An electrical feed-through apparatus is prevents or substantially reduces partial corona discharges in penetrators for high voltage supply for underwater facilities. A flange of a first thickness has an opening providing a passage between first and second oppositely located sides of the flange. An elongated tube of a solid, electrically insulating material has a first length greater than the first thickness, and is positioned in the passage, with first and second parts of the tube protruding from the first and second sides of the flange, respectively. First and second attachment sleeves are positioned on the tube and are attached to the first and second parts of the tube, respectively, at a distance from respective first and second ends of the tube. The sleeves are attached to the respective first and second oppositely located sides of the flange.

9 Claims, 5 Drawing Sheets

(56) References Cited

U.S. PATENT DOCUMENTS

| | | | | |
|---|---|---|---|---|
| 3,828,118 A * | 8/1974 | Bushek | ............... | H01B 17/30 174/11 R |
| 4,041,240 A * | 8/1977 | Sipowicz | ............... | H01B 17/30 174/151 |
| 4,117,254 A * | 9/1978 | Richter | ............... | B03C 3/70 174/15.3 |
| 4,168,394 A * | 9/1979 | Yuey | ............... | H01B 17/30 174/11 R |
| 4,174,145 A * | 11/1979 | Oeschger | ............... | H01R 13/521 174/152 GM |
| 4,185,164 A * | 1/1980 | Frosch | ............... | H01B 17/42 174/142 |
| 4,214,119 A * | 7/1980 | Keen, Jr. | ............... | H01B 17/30 174/18 |
| 4,476,155 A * | 10/1984 | Niemi | ............... | C08L 83/04 174/137 A |
| 4,492,421 A * | 1/1985 | Ito | ............... | H01B 17/30 439/271 |
| 4,584,429 A * | 4/1986 | Raketti | ............... | H01B 17/28 174/31 R |
| 4,678,868 A * | 7/1987 | Kraska | ............... | A61N 1/3754 174/152 GM |
| 4,727,223 A * | 2/1988 | Lee | ............... | H01B 17/30 174/151 |
| 4,876,898 A * | 10/1989 | Cage | ............... | G01F 1/8409 73/861.355 |
| 5,068,492 A * | 11/1991 | Britz | ............... | H01B 17/30 174/151 |
| 5,343,103 A * | 8/1994 | Aoki | ............... | H01B 17/26 174/77 R |
| 5,851,083 A * | 12/1998 | Palan | ............... | G01F 23/284 403/337 |
| 5,925,852 A * | 7/1999 | Hinz | ............... | H01B 17/30 174/652 |
| 6,286,373 B1 * | 9/2001 | Lister | ............... | G01F 1/8409 439/709 |
| 6,395,985 B1 * | 5/2002 | Djeddah | ............... | H01B 17/30 174/59 |
| 2001/0012727 A1 * | 8/2001 | Morlesin | ............... | H01B 17/30 439/559 |
| 2003/0081370 A1 * | 5/2003 | Haskell | ............... | H01G 4/35 361/306.1 |
| 2004/0173370 A1 * | 9/2004 | Deng | ............... | H01B 17/30 174/50.5 |
| 2008/0294220 A1 * | 11/2008 | Stevenson | ............... | A61N 1/3754 607/36 |
| 2008/0314616 A1 * | 12/2008 | Benestad | ............... | H01B 17/30 174/152 R |
| 2009/0120686 A1 * | 5/2009 | Paterek | ............... | F04C 23/008 174/650 |
| 2011/0233192 A1 * | 9/2011 | Parman | ............... | E21B 36/04 219/548 |
| 2011/0250774 A1 * | 10/2011 | Raad | ............... | H01R 13/523 439/271 |
| 2012/0067240 A1 * | 3/2012 | Hartl | ............... | F42B 3/103 102/202 |
| 2013/0014986 A1 * | 1/2013 | Ko | ............... | H01R 13/53 174/520 |

OTHER PUBLICATIONS

Office Action issued in BR application No. BR112015025864-6, dated Jun. 13, 2020.

* cited by examiner

HIGH VOLTAGE ELECTRIC POWER FEED-THROUGH APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to a method for reducing local corona discharges in a penetrator for feeding electricity through a wall in a pressure vessel or a pressurized pipe.

Description of the Related Art

Earlier subsea facilities for the production of oil and gas involved locating complex technology close to a permanent or fixed oil or gas field installation, the permanent or fixed installation typically being a platform construction made from steel or concrete. At greater water depths, permanent or fixed platform installations tend to become unreasonably costly. Floating installations are not sensitive to water depth to the same degree, although, as floating installations tend to move along with sea motion, they require more complex riser systems in order first to get the well stream on board and then again to have it exported. A complicating factor being that the unprocessed well stream cannot be transported directly in long pipelines. Furthermore, the pressure drop from the sea bed and up to the surface reduces the productivity of the well with the consequence that considerable quantities of oil and gas remain unextracted in the reservoir.

The well stream is advantageously processed to separate the well stream into oil and gas at the bottom of the sea, on the subsea field. Thereby the oil and gas fraction are ready to be pumped directly to the receiver. This requires subsea operation of pumps and compressors, which typically include electrically driven rotating machines. Operation of this type of electrically driven rotating machines require supply of considerable electrical power, necessitating high voltage transmission of electrical power over electrical installations that cannot be in direct contact with surrounding sea water. They need to be located in special chambers that also need to withstand substantial pressures. From this comes the need for a device for feeding high voltage electrical power through one or more subsea pressure barriers. Such a device is often called a "penetrator".

An important property of a penetrator is that it does not cause corona discharges, frequently referred to as "CD", from the English trade term "partial discharge". Penetrators for subsea applications may advantageously be made from a central copper conductor which is metallic connected with a ceramic hollow cylinder, as disclosed in Norwegian patent application (20111094).

Absence of PD is most important for the parts of an electric power supply that are insulated by polymers such as cross polymerized polyethyls, commonly designated PEX. This material will be broken down by discharges, leading to loss of insulating properties and short circuits. The penetrator itself, to the extent that it consist of only metals and ceramics is insensitive to PD, but it is advantageous that it does not exhibit PD because eventual PD in the penetrator will complicate detection of PD in other parts of the system.

The relative permittivity, also referred to as the dielectric constant, for ceramics is very large. This leads to large potential leap at those parts of the surface of the penetrator that are located close to the central conductor. In order to reduce PD, it is advantageous that such potential leaps do not lie on the surface of the ceramics. This can be achieved by metallizing the affected surfaces. These surfaces will generally be located on the inner diameter of the central bore of the ceramics. This bore can be called the inward cylindrical cavity.

SUMMARY OF THE INVENTION

The present invention consist of a method for reducing partial corona discharges by metallizing inward surfaces in subsea high voltage penetrators for thereby to improve exploitation of insulating capability and rupture strength in modern high performance ceramics in combination with technologies for metallic bonding in such penetrators.

DETAILED DESCRIPTION OF THE PREFERRED EMBODIMENT

Figure 1:
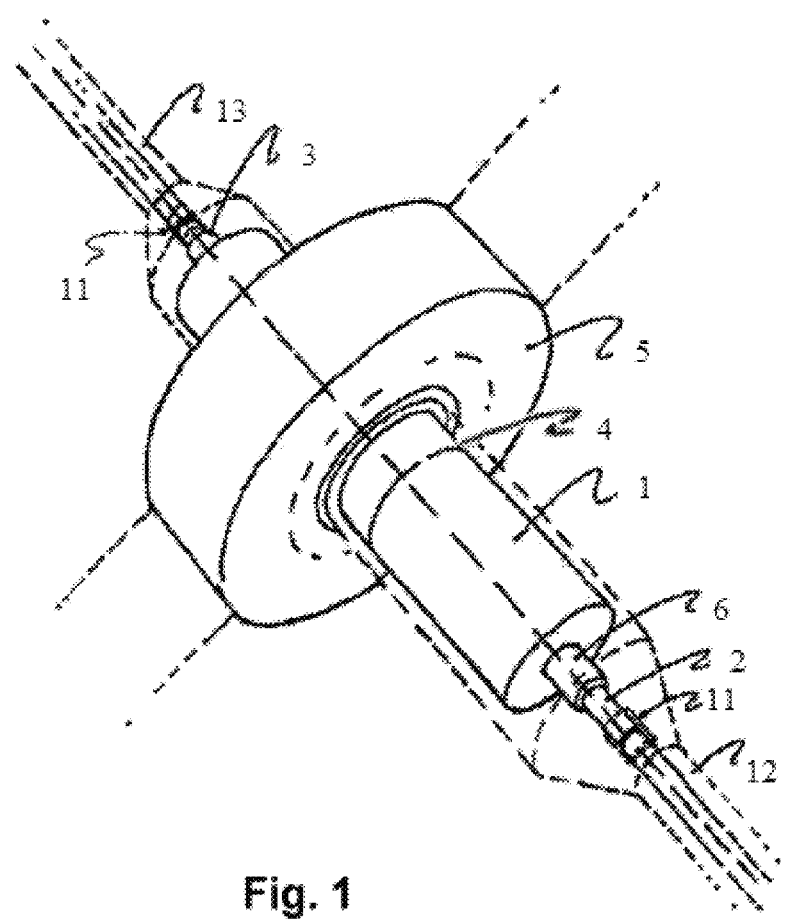
FIG. 1 illustrates that how the main parts in a possible embodiment of the device of the invention are located with respect to each other.

FIG. 1 shows a device according to the invention, characterized in that a ceramic insulator 1 is connected to a metallic flange 5. Through the insulator 1 is passed a conductor 2 which is affixed in the insulator by a fixed sleeve 3 and a unfixed sleeve 6.

According to the illustration of FIG. 1, the conductor is connected with cables 12 and 13 with sleeves according well known art. The cables 12 and 13 may also be welded or soldered to the conductor 2 according well known art.

Figure 2:
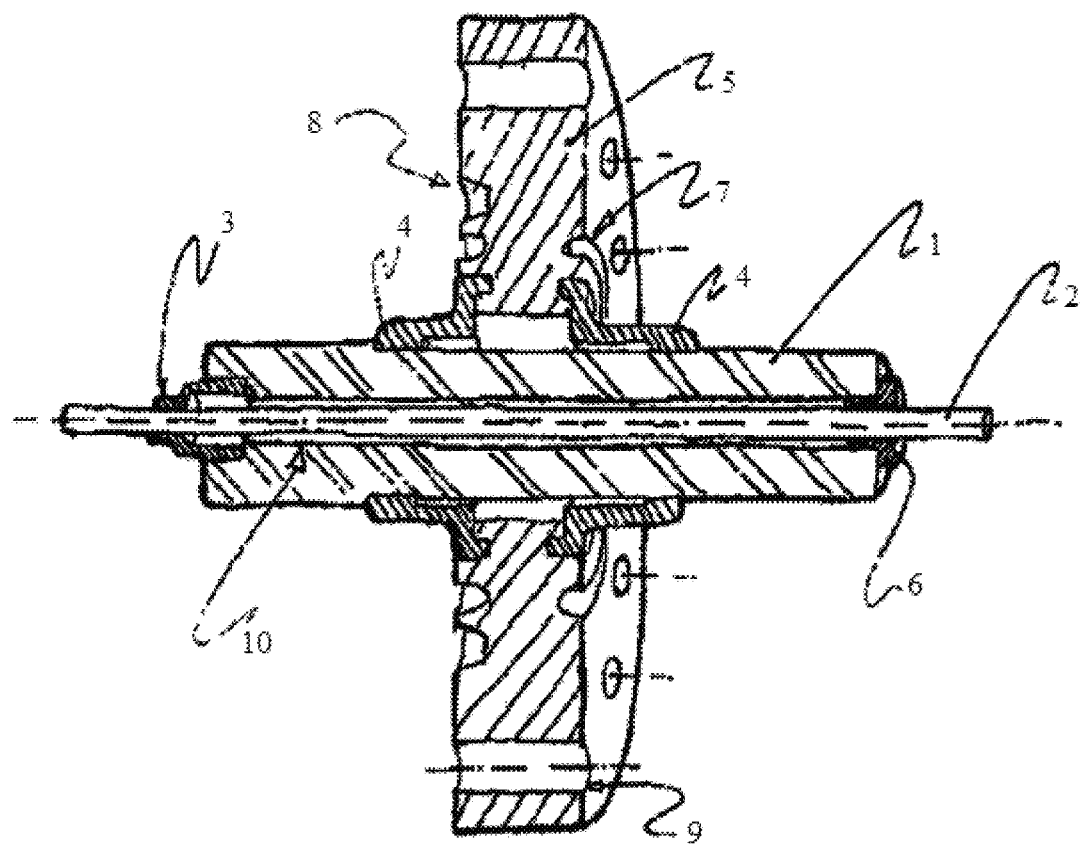
FIG. 2 illustrates the most essential details of the device including a ceramic insulator 1 and a conductor 2 of the invention.

FIG. 2 shows the components in a different embodiment of a penetrator according to the invention.

A conducting metal rod 2 is passed through a cylindrical cavity 10 in an insulator. In the arrangement of a conducting metal rod 2 is passed through a cylindrical cavity 10 in an insulator, the inward cylindrical cavity 10 is coated with a metal layer.

According to a further aspect, the invention provides a method for preventing or substantially reducing PD in penetrators for high voltage supply for underwater facilities, characterized in that an inward cylindrical cavity 10 in a ceramic insulation element along the conductor 2 is coated with a metallic conducting layer.

The present invention provides a high voltage electrical power feed-through, or "penetrator", apparatus according to any one of the attached patent claims 1 to 10.

The penetrator apparatus, illustrated by exemplary embodiments in the accompanying figures, comprises a flange 5, an elongated tube 1, first and second attachment sleeves 4, an elongated electrical conductor 2, and a third attachment sleeve 3.

In an embodiment of the invention, the third attachment sleeve 3 is axially offset from an adjacently located one of said first and second attachment sleeves 4.

In the accompanying drawing, a straight broken or dotted line has been drawn through a central part of the illustrated penetrator embodiments in different views thereof to indicate what will be referred to as a longitudinal direction or longitudinal axis of the high voltage electrical power feed-through or "penetrator" apparatus of the invention.

Figure 3:
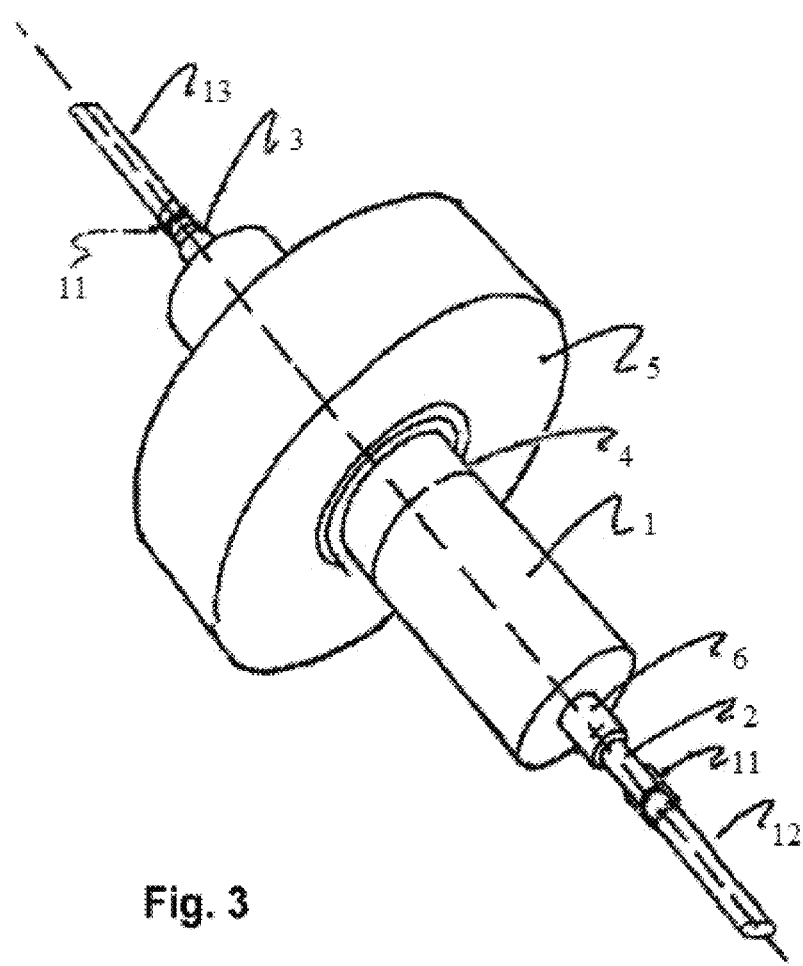
FIG. 3 illustrates an embodiment of device of FIG. 2 at an oblique angle.
Figure 4:
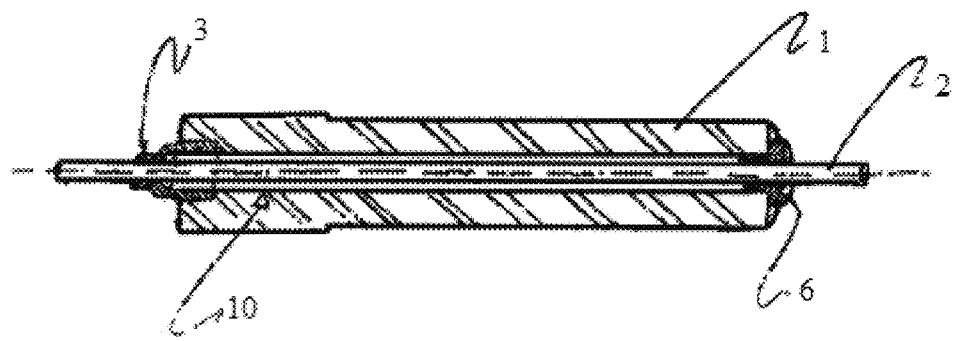
FIG. 4 illustrates an embodiment of the tube 1 including mounted sleeve 3 and end cap 6 of the invention shown in a partial cross section in a perspective view.

In FIG. 1 is also indicated by broken lines optional features of a penetrator when suitably applied or installed in a facility for supply electric power to power consuming devices, and indicated by reference signs relating to these optional features only in FIGS. 1 and 3 are insulated cables 12, connector means 11 for connecting the insulated cables 12 and 13 to the electrical conductor 2 of the penetrator device, and a shroud or cap arrangement on each side of the flange 5, covering the insulating tube 1, the attachment 3 and 4 sleeves on respective sides of the penetrator device, and the exposed ends of cables 12 and 13 and their respective connector means 11.

In FIG. 2, an embodiment of a penetrator apparatus according to the invention is shown in a partial cross section in a perspective view, illustrating the penetrator apparatus comprising a circular disc shaped flange 5, with a plurality through holes 9 provided for bolting the flange to a wall of a pressure vessel (not shown). Flat surfaces on oppositely located sides 7 and 8 of the flange disc are advantageously provided with respective circular groove type features located next to the arrow heads related to reference signs 7 and 8 for providing a suitable high pressure metal-to-metal seal, however, such sealing features on any of the surfaces of the flange disc are optional, since sealing may be provided by other suitable means, such as e.g. a conventional gasket or an o-ring arrangement, depending e.g. on the pressure to be sealed, on the media on respective sides of the flange, etc. Accordingly, the shape of the flange, here shown to be circular, could be any suitable shape for adapting it to the vessel or other device to which it is to be attached or bolted, such as e.g. any of a square, rectangular hexagonal, or elliptic shape.

The flange 5 is typically of a first thickness, and has an opening providing a passage between first 8 and second 7 oppositely located sides of said flange. The elongated tube 1 is advantageously of a solid, electrically insulating material, is of a first length greater than said first thickness, and is advantageously positioned in the passage of the flange, with first and second parts of said tube protruding from respective ones of said first and second sides of said flange. The flange is provided with a suitable number of through holes 9 for attaching it by bolts or similar fastener to a pressure vessel or other device. The first and second attachment sleeves 4 for attaching the insulating tube to the flange 5 are positioned on said tube and are advantageously sealingly attached to respective ones of said first and second parts of the tube, at a distance from respective first and second ends of said tube. The first and second attachment sleeves 4 are advantageously sealingly attached to respective ones of said first and second oppositely located sides 7 and 8 of said flange 5. Thereby, a space may formed between a central part of the tube and a wall or walls of the passage in the flange, the space being advantageously sealed off from the surroundings of the feed-through apparatus on at least one side of the flange. The elongated electrical conductor 2 is advantageously of a second length that is greater than said first length of the tube, and is advantageously positioned in a lumen 10 of said tube with first and second parts of said conductor protruding from respective ones of said first and second parts of said tube. The third attachment sleeve 3 is positioned on said conductor and is advantageously sealingly attached to one of said first and second parts of said conductor, at a distance from a respective one of a first and second end of said conductor, and is advantageously sealingly attached to a respective one of a first and second end of said tube.

Although it has been stated that the conductor 2 in the feed-through apparatus of the present invention is of a length greater than the length of the tube 1, and extends beyond ends of the tube 1, it will be understood that the conductor 2 as a unitary element could be of a shorter length than the length of the tube for not extending beyond the tube 1 at one or both ends, as its length may be extended by a suitable conducting extension element to form a conductor assembly having a length that is greater than the length of the tube 1, or extending beyond one or both ends of the tube 1, In an advantageous embodiment of the invention, as illustrated in FIGS. 1 to 6, an end cap 6 is advantageously provided at one end of the tube. The end cap 6 is contemplated to serve as a means for sealing off a space between the tube and the conductor, and/or to serve as a means for positioning the conductor within the lumen of the tube, e.g. in order to maintain it centered with respect to the lumen, or to maintain a desired space or gap between an outer surface of the conductor and an inward surface of the lumen of the tube, e.g. in order to obtain a desired electrical field configuration in the space or gap. Advantageously, the end cap 6 is not firmly attached to the conductor or to the tube to allow for relative movement of these items in axial or radial direction, such as e.g. in case of different thermal expansion or extension. Advantageously, the end cap 6 could made from a resilient and/or flexible material to maintain a seal between and/or maintaining relative positions of the conductor and the tube in case of relative movements of these items.

In an advantageous embodiment of the invention, a space 20 between the tube and the conductor is filled with an electrically insulating fluid being resistant to high voltage breakdown, such as e.g. a high voltage transformer oil or other fluid or liquid having a corresponding high voltage insulation property.

Figure 6:
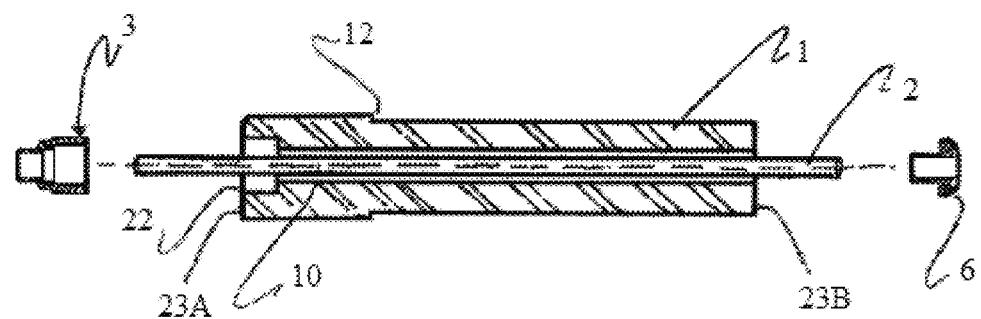
FIG. 6 illustrates an embodiment of the tube 1 including unmounted sleeve 3 and end cap 6 of the invention shown in a partial cross section in a perspective and exploded view.
Figure 7:
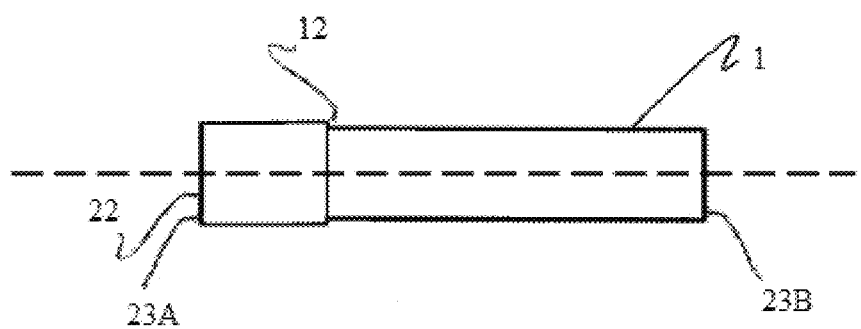
FIG. 7 illustrates an embodiment of the tube 1 including unmounted sleeve 3 and end cap 6 of the invention shown in a partial cross section in a perspective and exploded view in a side view.

In an advantageous embodiment of the invention, at least a part of an inward surface of said lumen 10 is supporting a layer of an electrically conducting material. In an further embodiment of the invention, the layer of conduction material is extended onto one or both end surfaces 23A, 23B of the tube, illustrated in FIGS. 6 and 7. It should be noted that the illustration in figure is a partial "exploded view" version of the partial assembly drawing of FIG. 4, in which the third attachment sleeve 3 and cap 6 are drawn as separated from the partial conductor and tube assembly. In FIGS. 6 and 7 are also illustrated further features of advantageous embodiments of the invention, particularly a section 22 of the lumen 10 within the tube having a larger inner diameter, for receiving a portion of the third attachment sleeve 3 having an outer diameter that is larger than an inner diameter of an adjacently located part of the lumen 10, and a first transition or step 12 between sections of the tube having different outer diameters. Advantageously, in connection with the section 22 of the lumen 10, there is a defined second transition or step at the point where the inner diameter of the lumen 10 changes. Advantageously, the first transition or step 12 of the outer diameter of the tube 1 is located proximal to an end surface 23A of the tube at which the section 22 of the lumen of the larger diameter is located.

The first and second transition or steps between inner diameters of the lumen 10 and between outer diameters of the tube 2, provide respective means for ensuring proper location of the respective first or second attachments sleeves 4 and the third attachment sleeve, respectively, and provide also respective strength taking portions of the tube for, in the case of a pressure differential between the side a 8 and 7 of the penetrator, coupling an axial force; exerted by pressure, from the conductor and attachment sleeve 3 assembly to the tube 1, and from the tube 1 and first attachment sleeve 4 on side 8 of the penetrator to the flange 5. The outer diameter transition or step 12 of the tube is more clearly shown in the side view illustration of the tube 1 in FIG. 7. The reference 22 in FIG. 7 has been included only to indicate the location of an opening in the end part 23A formed by the section of the lumen 10 having the larger inner diameter.

Figure 5:
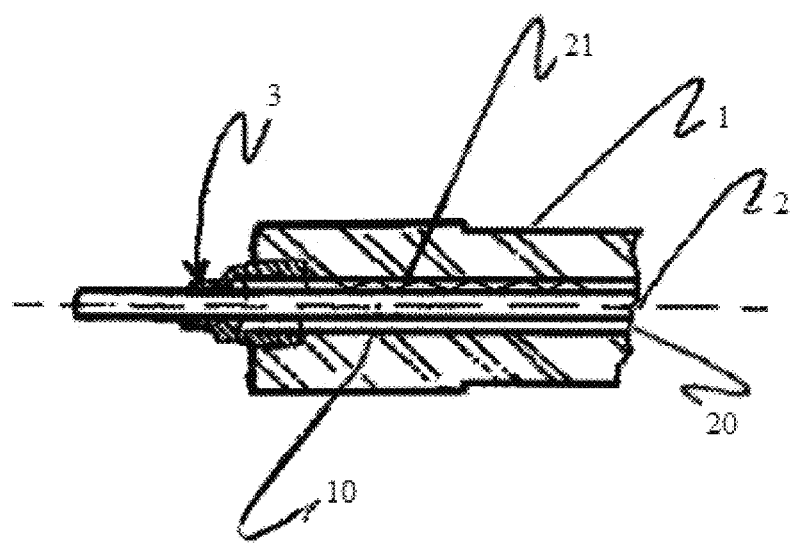
FIG. 5 illustrates an embodiment of the tube 1 including an electrically conducting means of the invention shown in a partial cross section in a perspective view.

As illustrated in the expanded detail view of FIG. 5, it is contemplated that in an embodiment, the apparatus of the invention comprises an electrically conducting means 21, being arranged in a space 20 between said conductor and said layer of a first electrically conducting material carried on a surface of the lumen 10, for establishing an electrically conducting path between said conductor and said layer of a first electrically conducting material. The electrically conducting means 21 could be provided alone, or in combination with an electrically conducting third attachment sleeve for establishing an electrically conducting path between the conductor and the layer of a first electrically conducting material.

In an advantageous embodiment of the invention, the third attachment sleeve comprises a first electrically conducting material. In an advantageous embodiment of the invention, the first electrically conducting material comprised in said third attachment sleeve 3 is adapted to provide an electrically conducting path between said conductor and said layer of an electrically conducting material, thereby bringing an electrical potential of the layer of an electrically conducting material towards an electrical potential of the conductor.

In an advantageous embodiment of the electrical feed-through apparatus of the invention, a diameter of a part of the conductor being positioned within said lumen is smaller than a diameter of said lumen so as to provide a gap 20 between an outer surface of the conductor and an inward surface of said lumen, as illustrated in the enlarged cross section detail of FIG. 5.

In an advantageous embodiment of the electrical feed-through apparatus of the invention, said layer said layer of a first electrically conducting material is a layer of metal or a layer of a semiconducting material, applied to the entire inward surface of the lumen.

According to a further aspect of the invention, said layer said layer of a first electrically conducting material is applied to a longitudinal portion of the inward surface of the lumen, the longitudinal portion extending axially between about the points of attachment to the tube 1 of the first and second attachment sleeves 4, respectively, or the longitudinal portion extending axially beyond the points of attachment to the tube 1 of the first and second attachment sleeves 4 but not entirely to ends 23A, 23B of the tube 1.

In an advantageous embodiment of the electrical feed-through apparatus of the invention, said electrically conducting means is constituted by said third attachment sleeve comprising a second electrically conducting material.

In an advantageous embodiment of the electrical feed-through apparatus of the invention, said electrically conducting means is constituted by a resilient electrical conductor 21 positioned in a gap between an outer surface of the conductor and an inward surface of said lumen. The resilient electrical conductor could e.g. be placed or wrapped around the conductor to form a ring connecting the electrical conductor to the conducting layer on their circumferences, or be located so as to form a longitudinal connection between surfaces of the electrical conductor and the conducting layer.

The conducting layer is advantageously a layer of metal which has been applied to the surface by a method of vapor deposition, chemical deposition, electrolytic deposition, sputtering, or spraying.

What is claimed is:

1. An electrical feed-through apparatus for preventing partial corona discharges, PD, in penetrators for high voltage supply for underwater facilities, the apparatus comprising:
   a flange of a first thickness and having an opening providing a passage between first and second oppositely located sides of said flange,
   an elongated tube of a solid, electrically insulating material, and of a first length greater than said first thickness, being positioned in said passage, with first and second parts of said tube protruding from respective ones of said first and second sides of said flange,
   first and second attachment sleeves positioned on said tube and being attached to respective ones of said first and second parts of said tube, at a distance from respective first and second ends of said tube, and being attached to respective ones of said first and second oppositely located sides of said flange,
   an elongated electrical first conductor of a second length greater than said first length, and being positioned in a lumen of said tube with first and second parts of said first conductor protruding from respective ones of said first and second parts of said tube, and
   a third attachment sleeve being positioned on said first conductor and being attached to one of said first and second parts of said first conductor, at a distance from a respective one of a first and second end of said first conductor, and being attached to a respective one of a first and second end of said tube,
   wherein at least a part of an inward surface of said lumen is supporting a layer of a first electrically conducting material,
   wherein the apparatus further comprising a second conductor comprising a resilient electrical conductor configured to establish an electrically conducting path between said first conductor and said layer of said first electrically conducting material,
   wherein said second conductor is positioned in a gap between an outer surface of the first conductor and an inward surface of the lumen of the tube such that a longitudinal connection between the outer surface of the first conductor and the conducting material is formed in the gap, and wherein the first conductor is wrapped in the second conductor at least along a portion of the tube extending from an end of the tube in a longitudinal direction toward an opposite end of the tube such that the second conductor forms a longitudinal connection between the surfaces of the elongated electrical first conductor and the layer of the first electrically conducting material, wherein the second conductor elongating in the longitudinal direction has a first side and a second side, and the first side of the elongated second conductor directly contacts the outer surface of the first conductor, and the second side of the elongated second conductor directly contacts the first electrically conducting material, wherein said layer of said first electrically conducting material is provided on a longitudinal portion of said inward surface of said lumen, wherein said longitudinal portion extends axially beyond points of attachment to said tube of said first and second attachment sleeves but not entirely to ends of said tube.

2. The electrical feed-through apparatus according to claim 1, wherein a diameter of a part of said first conductor being positioned within said lumen is smaller than a diameter of said lumen so as to provide a gap between an outer surface of said first conductor and an inward surface of said lumen.

3. The electrical feed-through apparatus according to claim 1, wherein said layer of said first electrically conducting material is a layer of a metal or a layer of a semiconducting material, the layer being applied to an entire inward surface of the lumen.

4. The electrical feed-through apparatus according to claim 1, wherein said second conductor is attached to the first conductor integrally with said third attachment sleeve comprising a second electrically conducting material.

5. The electrical feed-through apparatus according to claim 1, wherein said layer of said first electrically conducting material is provided on a longitudinal portion of said inward surface of said lumen, said longitudinal portion extending axially between about the points of attachment to said tube of said first and second attachment sleeves, respectively.

6. The electrical feed-through apparatus according to claim 1, comprising an end cap having a passage for said first conductor, and being positioned at a second end of said tube located oppositely to a first end of said tube at which said third attachment sleeve is located.

7. The electrical feed-through apparatus according to claim 1, wherein at least one of said first and second attachment sleeves is sealingly attached to said respective one of said first and second parts of said tube, and sealingly attached to said respective one of said first and second oppositely located sides of said flange, and said third attachment sleeve is sealingly attached to said one of said first and second parts of said first conductor, sealingly attached to said respective one of a first and second end of said tube.

8. The electrical feed-through apparatus of claim 1, wherein the layer of the first electrically conducting material is disposed on the inward surface of the lumen, and wherein the second conductor is disposed in a space between the first conductor and the layer of the first electrically conducting material.

9. The electrical feed-through apparatus of claim 1, wherein said second conductor extends along the inward surface of the lumen of the tube and at least beyond said first and second parts of the tube.

* * * * *